United States Patent [19]

Hino et al.

[11] 4,285,411

[45] Aug. 25, 1981

[54] ELECTRONIC WEIGHING APPARATUS

[75] Inventors: Masamichi Hino, 9-3, Aoyamadai 2-chome, Suita-shi, Osaka-fu; Seiichi Itani, 22-407, Shinkanaoka-cho 3-1, Sakai-shi, Osaka-fu, both of Japan

[73] Assignee: Kubota Ltd., Osaka, Japan

[21] Appl. No.: 96,540

[22] Filed: Nov. 21, 1979

[30] Foreign Application Priority Data

Mar. 14, 1979 [JP] Japan .................................. 54-30269
Jun. 5, 1979 [JP] Japan .................................. 54-71015

[51] Int. Cl.$^3$ .......................................... G01G 19/44
[52] U.S. Cl. .................... 177/25; 177/211; 177/DIG. 3
[58] Field of Search ................... 177/210 FP, DIG. 3, 177/25, 159, 186, 164, 211; 364/466, 567

[56] References Cited

U.S. PATENT DOCUMENTS

| | | | |
|---|---|---|---|
| 3,674,097 | 7/1972 | Gile | 177/25 X |
| 3,698,493 | 10/1972 | Yamanaka | 177/25 X |
| 3,860,802 | 1/1975 | Knothe | 177/25 X |
| 3,869,004 | 3/1975 | Gallo | 177/25 |
| 4,008,405 | 2/1977 | Neumann | 177/25 X |
| 4,115,767 | 9/1978 | Brosh | 177/DIG. 3 |
| 4,207,955 | 1/1980 | Teraoka | 177/25 |

Primary Examiner—Joseph W. Hartary
Attorney, Agent, or Firm—W. G. Fasse; D. F. Gould

[57] ABSTRACT

An electronic weighing apparatus comprises a load cell which provides an analog voltage associated with the weight of an article being placed on the apparatus. The analog voltage is converted into digital data responsive to each timing pulse by means of an analog/digital converter. The digital data is loaded in a digital display buffer responsive to each timing pulse and is then displayed in a digital manner by a display. On the other hand, a stable state detecting circuit compares the current digital data obtained from the analog/digital converter with the preceding digital data and determines the weighed value having reached a stable state upon coincidence of both the current and preceding pieces of the data. The timing pulse and thus the digital data is prevented from being loaded in the display buffer responsive to the output from the stable state detecting circuit, whereby the display buffer continues to maintain the digital data at the time point when the stable state is reached. Accordingly, the numerical value displayed by the display maintains the weighed value of the stable state. If and when the weighed value becomes below a predetermined value, the display buffer is loaded in a renewed manner with the digital data obtained in succession from the analog/digital converter.

16 Claims, 9 Drawing Figures

ELECTRONIC WEIGHING APPARATUS

BACKGROUND OF THE INVENTION

1. Field of the Invention

The present invention relates to an electronic weighing apparatus. More specifically, the present invention relates to an electronic weighing apparatus employing a strain gage type load cell, such as a body weight scale, price computing scale and the like.

2. Description of the Prior Art

Of late, electric or electronic weighing apparatuses have employed a strain gage type load cell. Since such a load cell can be structured without a movable means, it has the characteristic features that a chance of trouble is little and the same operates in a very stable manner. If a load cell is employed in a body weight scale for babies, little or no movement of a placing pan such as a basket for placement of a baby eliminates uncomfortableness or fright which a baby might have felt when the placing pan is movable. For this reason, an electronic weighing apparatus employing a load cell can be advantageously used as a body weight scale for babies.

Such a baby body weight scale as described in the foregoing has been used in a hospital to effectively control the body weight of babies. However, generally babies are seldom still and rather they always move their hands and feet. Accordingly, in measuring the body weight of the babies using such electronic body weight scale, a displayed body weight is changeable in accordance with the movement of the baby. On the other hand, considering a situation of an obstetrical hospital, a large number of babies need undergo baby weight measurement by a few number of nurses; however, such an unstable display as described in the foregoing by virtue of the movement of the babies prolongs a time required for baby weight measurement. Accordingly, in measuring a body weight of babies by the use of such a body weight scale, it is desired that a correct baby weight value can be read with ease and with promptness. Such desire is felt not only to a body weight scale for babies but also to other weighing apparatuses such as a price computing scale and the like.

SUMMARY OF THE INVENTION

Briefly described, the present invention comprises an electronic weighing apparatus which continually displays a renewed weighed value until the weighed value reaches a stable state and, when the weighed value once reaches a stable state, continues to display the weighed value at the time point when the stable state is reached as a weight value.

According to the present invention, even in case of measurement of the weight of an article which is movable, such as a baby, a display is not astable and therefore enables reading of a weighed value, with a given precision maintained, with promptness and with accuracy.

In a preferred embodiment of the present invention, the weighed value at the time point when a stable state is reached is maintained until the newest weighed value becomes below a predetermined value, whereupon the above described display maintaining state is released. Accordingly, when an article being weighed is removed from the apparatus after the article is placed and a stable state is once reached and the weighed value is read in such a state, then the display maintaining state is automatically released, with the result that the operation is extremely simple.

In a further preferred embodiment of the present invention, determination of whether the weighed value has reached a stable state is made by comparing the digital data obtained responsive to each timing pulse with the preceding digital data a plurality of times and by determining a stable state when the difference becomes within a predetermined value, including the case of zero. Thus, a stable state can be determined in an electrical manner, which can be advantageously employed even in a weighing apparatus employing a transducer such as a load cell which does not involve a mechanical displacement.

Accordingly, a principal object of the present invention is to provide an improved electronic weighing apparatus.

Another object of the present invention is to provide a simple electronic weighing apparatus which provides a display of a weighed value readable with ease.

A further object of the present invention is to provide an electronic weighing apparatus of easy operation.

These objects and other objects, features, aspects and advantages of the present invention will become more apparent from the following detailed description when taken in conjunction with the accompanying drawings.

BRIEF DESCRIPTION OF THE DRAWINGS

FIGS. 3A and 3B are graphs for explaining an operation of the present invention, wherein FIG. 3A shows a characteristic of a load (ordinate) with respect to the time (abscissa) and FIG. 3B shows a characteristic curve of the displayed data (ordinate) with respect to the time (abscissa);

DESCRIPTION OF THE PREFERRED EMBODIMENTS

Figure 1:
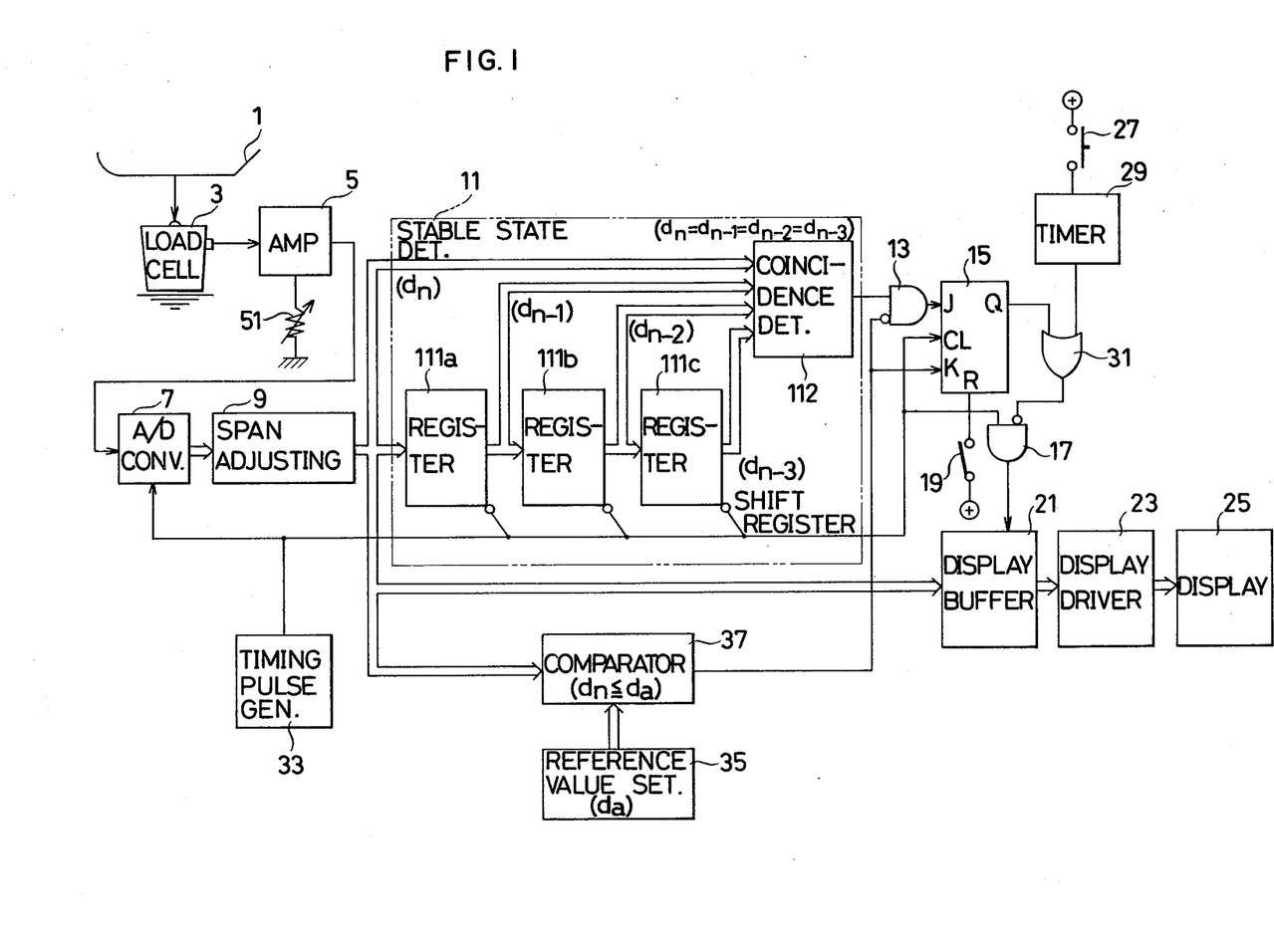
FIG. 1 is a block diagram of one embodiment of the present invention.

FIG. 1 is a block diagram showing one embodiment of the present invention. The embodiment shown comprises an article placing pan 1, which is mechanically coupled to a load cell 3 of a strain gage type. The load cell 3 provides an analog voltage in association with the weight of an article, not shown, being placed on an article placing pan 1. The analog signal associated with the weight value obtained from the load cell 3 is amplified by an amplifier 5 and is applied to an analog/digital converter 7. The amplifier 5 comprises a gain adjusting means, i.e. a variable resistor 51 for the purpose of span adjustment. Accordingly, the amplifier 5 serves to amplify the above described analog signal with an amplification degree set by the variable resistor 51. The analog/digital converter 7 provides digital data associated with the analog signal responsive to each of the timing pulses obtained from a timing pulse generator 33 through an inhibit gate 31. The output of the analog/-digital converter 7 and thus the digital data associated with the weight of the article is applied, through a span adjusting circuit 9, as to be described in detail subsequently with reference to FIGS. 4 and 5, to a stable state detecting circuit 11, a display buffer 21 and a comparator 37 as inputs thereto.

The stable state detecting circuit 11 is aimed to detect whether the analog signal obtained from the load cell 3 and thus the digital data obtained from the analog/digital converter 7 has reached a stable state and in the embodiment shown comprises a shift register including three registers 111a, 111b and 111c connected in a cascade fashion, and a coincidence detecting circuit 112. The three registers 111a, 111b and 111c are responsive to each of the timing pulses obtained from the above described timing pulse generator 33 to make a shift operation of the digital data as stored therein toward the subsequent stage. The output of the span adjusting circuit 9 and the outputs of the registers 111a, 111b and 111c are all applied to a coincidence detecting circuit 112. The coincidence detecting circuit 112 is aimed to detect whether the four pieces of the digital data obtained from the blocks 9, 111a, 111b and 111c coincide with each other and comprises an exclusive OR (NOR) gate and an AND gate, not shown, for example. The coincidence detecting circuit 112 is structured such that upon coincidence of the above described four pieces of the digital data, the same provides the high level output. The output from the stable state detecting circuit 11 is applied to an input of an inhibit gate 13. An inhibit input of the inhibit gate 13 is obtained from the output of the comparator 37. The comparator 37 serves to compare a given reference value set in a reference value setting circuit 35, such as a minimum display weight value, say 2 gram, and the digital data obtained from the span adjusting circuit 9, thereby to provide the high level output when the weighed value becomes below the reference value. The output of the comparator 37 is applied to the input K of a J-K flip-flop 15. The input J of the flip-flop 15 is connected to receive the output of the above described inhibit gate 13. The clock input of the J-K flip-flop 15 is connected to receive the timing pulse obtained from the timing pulse generator 33 described previously. The timing pulse is also applied to the input of an inhibit gate 17. The inhibit input of the inhibit gate 17 is connected to receive the output of an OR gate 31. One input of the OR gate 31 is connected to receive the output Q of the above described J-K flip-flop 15. The reset terminal R of the flip-flop 15 is connected to the switch 19.

The switch 19 is provided outside of the housing, not shown, of the apparatus, so that an operator can manually operate the switch. The switch 19 is used as a switch for selecting a displayed value being maintained when a stable state is detected or the newest weighed value being normally displayed without the displayed value being fixed. In order to maintain the display value in a constant state when a stable state is reached, the switch 19 is kept off. On the other hand, in order to normally display the newest weighed value without the weighed value being maintained, the switch 19 is turned on.

Figure 2:
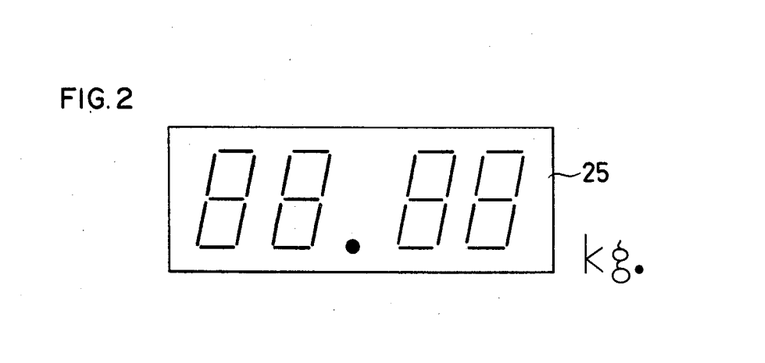
FIG. 2 is a diagrammatical view showing one example of a display.

The output of the inhibit gate 17 is applied to the display buffer 21 as a store enable signal. As described previously, the display buffer 21 has been loaded with the digital data obtained from the span adjusting circuit 9. The digital data as stored in the display buffer 21 is applied to a display driver 23, so that the digital data is displayed in a digital manner by means of a digital display 25. Although not shown, the display driver 23 may comprise a well known segment decoder. As shown in FIG. 2, the digital display 25 comprises four digit display positions, each comprising an arrangement of seven display segments arranged in the numeral "8" shape, so that selective energization of the segments enables display of any one of the numerals 0, 1, 2, ... 9 in the well known manner.

On the other hand, a manually operable switch 27 is further provided outside of the casing, not shown, of the apparatus. The switch 27 is operated to maintain the displayed numerical value of the display 25 for a given period of time as determinable by a timer 29, for example. Accordingly, the switch 27 is connected to the trigger input of the timer 29, so that the timer 29 provides the high level output for a given period of time, say about eight seconds. The output of the timer 29 is applied to the other input of the OR gate 31.

Now that the structural features of the apparatus were described in the foregoing, an operation of the FIG. 1 embodiment will be described in the following. At the outset, the switch 19 is operated to select either a mode for maintaining the weighed value in a stable state in the display 25 or a mode for memory displaying the newest weighed value in the display 25. Description is first made of a case where the switch 19 is not operated, so that the contact remains off.

Figure 3A:
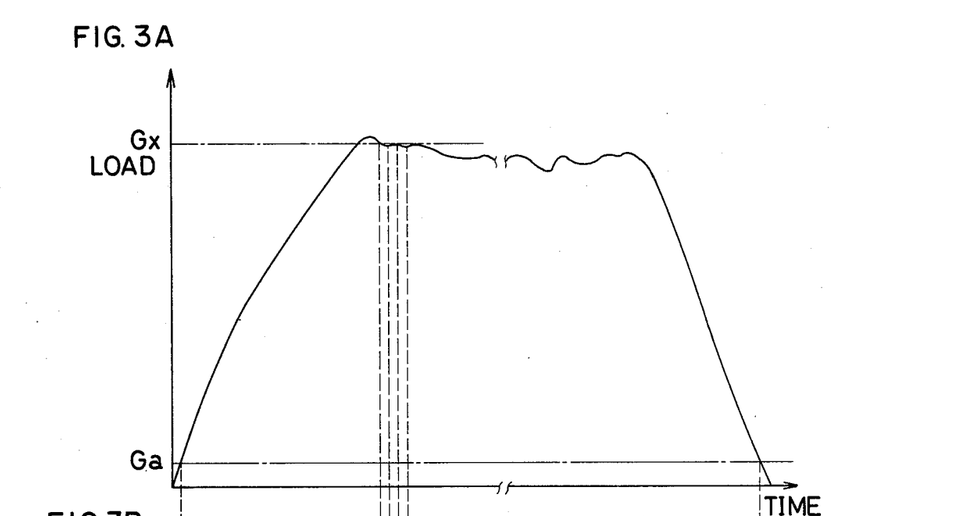

An article being weighed is placed on the article placing pan 1. Then an analog voltage associated with the weight of the article placed on the article placing pan 1 is obtained from the load cell 3, as shown in FIG. 3A. The analog voltage thus obtained is subjected to analog/digital conversion into the digital data responsive to the output of the inhibit gate 31, i.e. responsive to each timing pulse obtained from the timing pulse generator 33. The digital data obtained from the analog/digital converter 7 responsive to each timing pulse is withdrawn through the span adjusting circuit 9. In the stable state detecting circuit 11, the digital data $d_n$ at the timing $t_n$, for example, is applied to the coincidence detecting circuit 112. The digital data $d_{n-1}$ at the timing $t_{n-1}$ immediately before the timing $t_n$ is applied from the register 111a to the coincidence detecting circuit 112. The digital data $d_{n-2}$ at the timing $t_{n-2}$ is obtained from the register 111b and the digital data $d_{n-3}$ at the timing $t_{n-3}$ is obtained from the register 111c, respectively, to the coincidence detecting circuit 112. The coincidence detecting circuit 112 detects whether the above described four pieces of data $d_n$, $d_{n-1}$, $d_{n-2}$ and $d_{n-3}$ are equal ($d_n=d_{n-1}=d_{n-2}=d_{n-3}$) to provide the high level output at the timing $t_n$.

On the other hand, the comparator 37 provides the high level output if and when the newest digital data $d_n$ is equal or is smaller than the reference value (for example $d_a$). Accordingly, although the comparator 37 instantaneously provides the high level output at the initial condition of the weight measurement, thereafter the same normally provides the low level output. Therefore, when the high level output is obtained from the stable state detecting circuit 11 at the timing $t_n$, the output of the comparator 37 has already been the low level. Accordingly, the inhibit gate 13 has been released from being inhibited, so that the J-K flip-flop 15 is set at the timing $t_n$. Accordingly, at the timing $t_n$ the output Q of the flip-flop 15 turns to the high level, whereby the inhibit gate 17 is inhibited. Accordingly, after the timing $t_n$ the display buffer 21 is prevented from being supplied with the timing pulse from the timing pulse generator 33. More specifically, the display buffer 21 is prevented from being loaded with the newest digital data after the timing $t_n$.

Figure 3B:
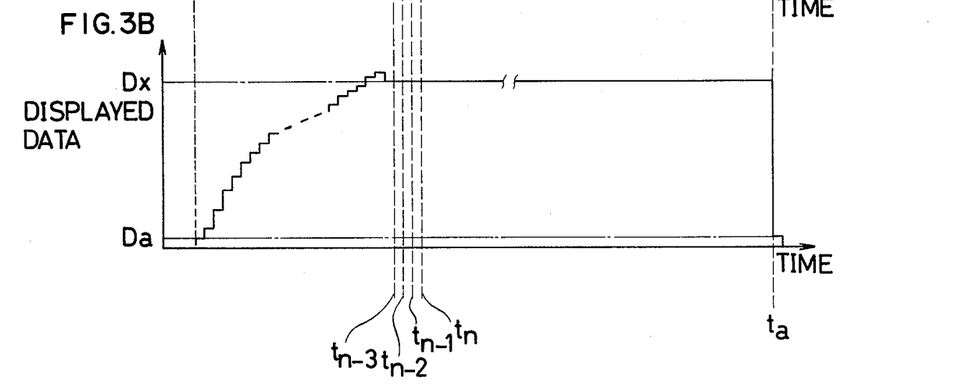

Meanwhile, it is pointed out that until the high level is obtained from the stable state detecting circuit 11, i.e. until the timing $t_n$, the inhibit gate 17 has not been inhibited and accordingly the timing pulse obtained from the timing pulse generator 33 has been applied to the display buffer 21. Accordingly, the display buffer 21 has been loaded in a renewed manner with the digital data obtained from the span adjusting circuit 9 responsive to each timing pulse. Therefore, during a period up to the timing $t_n$ the weighed value obtained in succession is displayed in a renewed manner in the display 25, as shown in FIG. 3B.

If the stable state detected signal of the high level is once obtained from the stable state detecting circuit 11, thereafter the display buffer is not renewed with the newest digital data. Therefore, the prescribed weighed value $D_x$ (corresponding to the weight value $G_x$ shown in FIG. 3A) is maintained in the digital display 25, as shown in FIG. 3B.

Thereafter, when the article is removed from the article placing pan 1, the weight applied to the load cell 3 is decreased as shown in FIG. 3A. Accordingly, the analog voltage obtained from the amplifier 5 is also decreased. At a given timing $t_a$, the high level output is obtained from the comparator 37. More specifically, at the timing $t_a$ the newest digital data $d_n$ becomes below the reference value $d_a$ set by the reference value setting circuit 35 ($d_n \leq d_a$). Then the J-K flip-flop 15 is reversed in the storing state, whereby the inhibit gate 17 is released from being inhibited, while the inhibit gate 13 is again supplied with the inhibit input. Therefore, it follows that the timing pulse is applied again from the timing pulse generator 33 through the gate 17 to the display buffer 21. In other words, after the timing $t_{a'}$ again the display buffer 21 is loaded in a renewed manner with the newest digital data, whereby the data displayed by the display 25 is accordingly renewed.

In summary, until the weighed value reaches a stable state, the newest weighed value is displayed in the display 25 in a digital manner and, if and when the weighed value once reaches a stable state, thereafter the display continues to display the weighed value ($D_x$) at the timing when the stable state is reached, until the timing when the newest weighed value ($d_n$) becomes below the predetermined weight value ($d_a$). Thus, during the time period from the timing $t_n$ to the timing $t_a$ the display 25 displays the same data ($D_x$). Accordingly, even if a variation occurs in the weighed value G during that time period, as shown in FIG. 3A, for example, an indication by the display 25 is not influenced at all. Accordingly, an indication by the display 25 is stable irrespective of the state of the article being placed on the article placing pan 1, which enables reading of the displayed data with extreme ease. Meanwhile, if and when the newest weighed value $d_n$ becomes below the predetermined value $d_a$, such a display maintained state is automatically released and therefore, in making meaurement of the weight of another article, any particular operation is not required to release such a display maintained state. Meanwhile, in order to release such a display maintained state by means of a particular operation, any particular switch may be provided, although not shown, as is needless to say.

Now a description will be made of a case where upon operation of the switch 19 the contact of the same has been turned on. In such a situation, since the flip-flop 15 has been normally reset, the output Q thereof does not become the high level. Accordingly, the inhibit gate 17 is not inhibited and accordingly the timing pulse is kept applied from the timing pulse generator 33 to the display buffer 21. Accordingly, the display buffer 21 stores in a renewed fashion the digital data from the analog/digital converter 7 and thus from the span adjusting circuit 9. Accordingly, the display 25 also normally displays the newest weighed value.

Further consider a case whereupon operation of the switch 19 to disable the display maintaining means the switch 27 is further operated. Then concurrently with turning on of the contact of the switch 27, the timer 29 is triggered, whereby the high level output is obtained from the timer 29 for a predetermined period of time, say eight seconds. Accordingly, the output of the OR gate 31 becomes the high level for the time period achieved by the timer and during that time period the inhibit gate 17 serves to inhibit the timing pulse from the timing pulse generator 33 from being applied to the analog/digital converter 7. Accordingly, the analog/digital converter 7 maintains the digital data achieved at that timing for the time period achieved by the timer 29. Accordingly, the display buffer 21 keeps storing the same digital data during the time period achieved by the timer 29, with the result that the same weight value is displayed by the display 25. Accordingly, even in case where the switch 19 is turned on, an indication by the display 25 is fixed by operating the switch 27, whereby the indication can be read and written down without a mistake.

Meanwhile, in the FIG. 1 embodiment and also in the FIG. 8 embodiment to be described subsequently, the manual switch 19 may be omitted.

Now referring to FIGS. 4 and 5, the span adjusting circuit 9 will be described. The span adjusting circuit 9 is provided for the purpose of making adjustment such that when an article of a known weight value is placed on the article placing pan 1 the said weight value is correctly displayed by the display 25. To that end, the span adjusting circuit 9 comprises a numerical value setting switch 91 for setting a numerical value and a multiplier 92 for span adjustment. The multiplier 92 is supplied with the digital data signal from the analog/digital converter 7 responsive to each timing pulse. The switch 91 is structured to be adaptable for setting a numerical value smaller than the value 0.9999 so that the digital data corresponding to the set numerical value is applied to the multiplier 92. The analog/digital converter 7 is structured such that when the set numerical value of the numerical setting switch 91 is the value "0.9999" an excessive span characteristic as shown by the curve a1 in FIG. 5 is achieved. In order to achieve an excessive span tendency, the span is selected to be larger by means of a variable resistor 51. Thus, in making span adjustment, the switch 91 is manually operated to variably select and set a numerical value smaller than the value "0.9999" so that desired span adjustment may be achieved. More specifically, the numerical value setting switch 91 is adjusted such that when a rated weight is placed on the article placing pan 1 the said rated weight value is displayed by the display 25, whereby a normal span characteristic as shown by the curve a in FIG. 5 is achieved.

It is pointed out that the embodiment is structured such that the two more significant digits of a numerical value being set are fixedly set to "9" while the two lower significant digits are variable by means of the above described numerical value setting switch 91. According, a less number of multiplication processing steps is only required by the multiplier 92. Such span adjusting circuit 9 can be particularly advantageously utilized in combination with the variable resistor 51 shown in FIG. 1. More specifically, the embodiment may be structured such that coarse or rough span adjustment is made by the variable resistor 51 while fine span adjustment is made by the span adjusting circuit 9, whereby the number of digits of the numerical value setting switch 91 may be small while span adjustment can be made in a wider range.

Since the span adjusting circuit 9 is structured such that digital multiplication is made by the multiplier 92, stable span adjustment can be achieved without being adversely affected by the environmental conditions such as temperature, humidity and the like. Furthermore, since the numerical value setting switch 91 is structured to be capable of setting a numerical value in a digital manner, very fine adjustment can be made with accuracy and simplicity.

Figure 4:
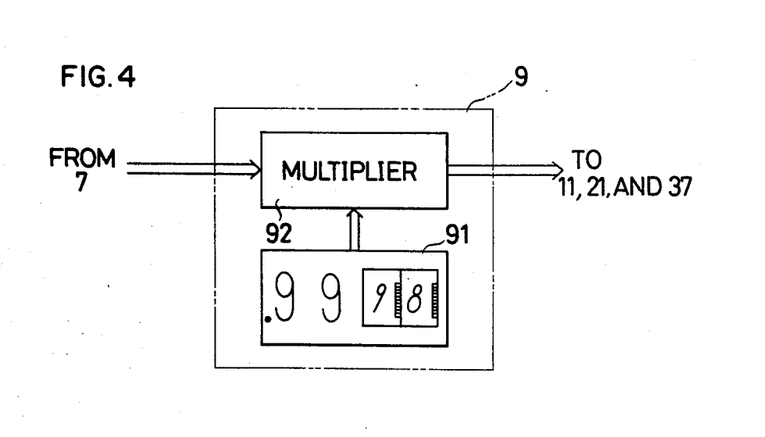
FIG. 4 is a block diagram showing one example of a span adjustment circuit.
Figure 5:
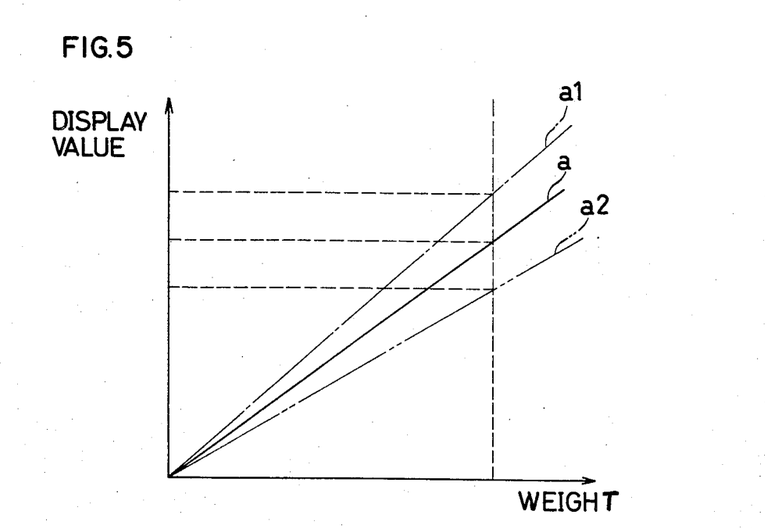
FIG. 5 is a graph explaining a span adjustment, wherein the abscissa indicates the weight and the ordinate indicates the display value.

Although in the FIG. 4 embodiment the analog/digital converter 7 was structured such that even the multiplier of the value "0.9999" for the multiplier 92 may be an excessive span characteristics as shown by the curve a1 in FIG. 5, conversely even the multiplier of the value "1.1111" for the multiplier 92 may be a deficient span characteristic as shown by the curve a2 in FIG. 5. Although the FIG. 4 embodiment was described as comprising the span adjusting circuit 9 comprising the multiplier 9, conversely the span adjusting circuit 9 may comprise a divider.

Figure 6:
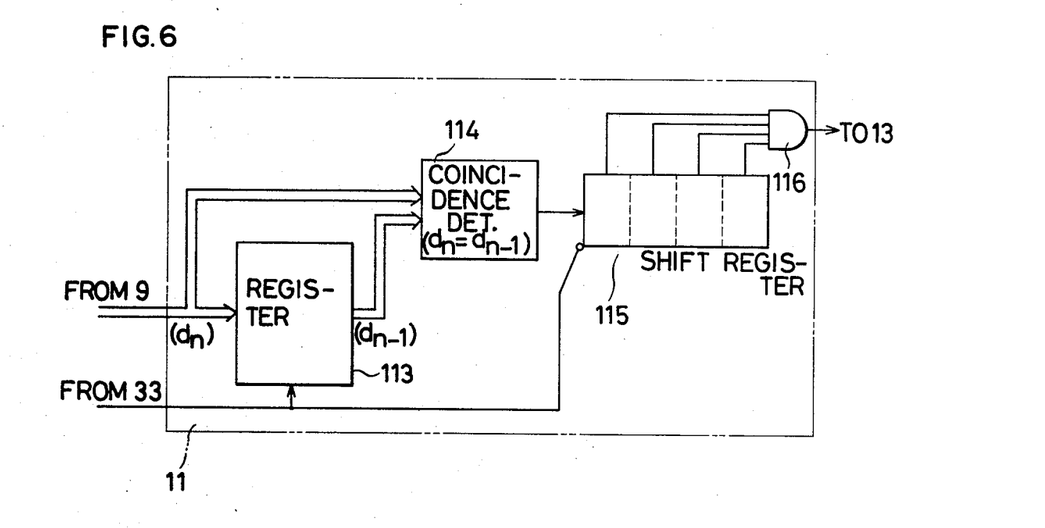
FIGS. 6 and 7 are block diagrams showing different embodiments of stable state detecting circuits, respectively.

FIG. 6 is a block diagram showing another embodiment of a stable state detecting circuit 11 for use in the present invention. The FIG. 6 embodiment comprises a single register 113, a coincidence detecting circuit 114, a shift register 115 of say four bits, and an AND gate 116. The shift register 113 is connected to receive the digital data obtained from the span adjusting circuit 9 and operates to store in a renewed manner the said digital data and to shift out the previous data responsive to each timing pulse from the timing pulse generator 33. The digital data at the input side of the register 113, i.e. the newest digital data $d_n$ and the data at the output side of the register 113, i.e. the previous digital data $d_{n-1}$ are both applied to the coincidence detecting circuit 114. The coincidence detecting circuit 114 compares both pieces of the data and provides the high level output if and when both pieces of the data $d_n$ and $d_{n-1}$ are equal to each other. The output of the coincidence detecting circuit 114 is applied to the shift register 115 which comprises four storing cells, for example. The shift register 115 makes a sequential shift operation responsive to each timing pulse from the timing pulse generator 33. The content in each cell of the shift register 115 is inputted to each of the four inputs of the AND gate 116 in a bit parallel fashion. Accordingly, the AND gate 116 provides a stable state detecting output of the high level for the first time if and when the coincidence detected output is obtained consecutively four times from the coincidence detecting circuit 114.

Figure 7:
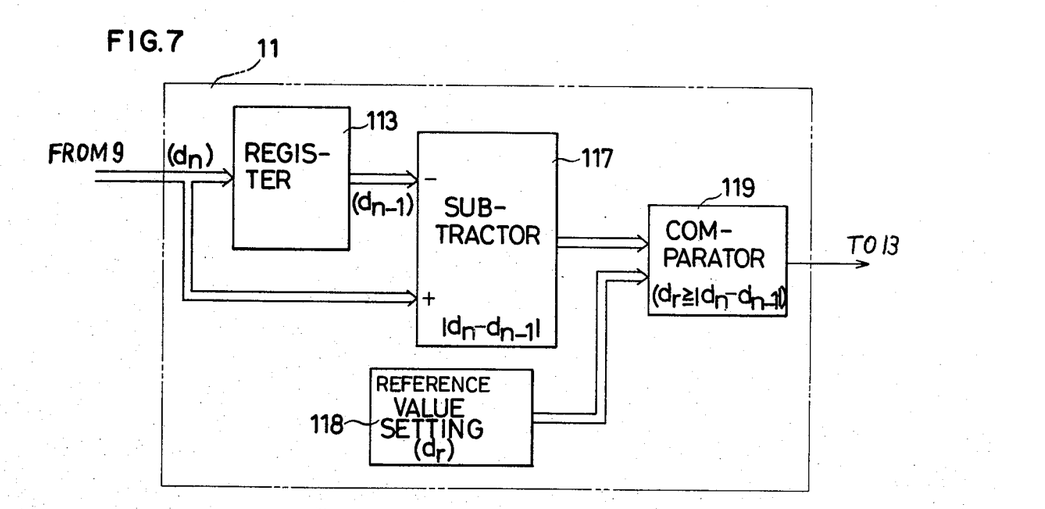

FIG. 7 is a block diagram showing another embodiment of a stable state detecting circuit 111 for use in the present invention. Referring to the embodiment shown, the stable state detecting circuit 11 comprises a register 113, a subtractor 117, a reference value setting circuit 118 and a comparator 119. The register 113 operates to shift out the data previously stored and to store a new piece of data responsive to each timing pulse from the timing pulse generator 33 as done in the FIG. 6 embodiment. The timing pulse is also applied to the subtractor 117 as a subtraction enable signal.

Accordingly, the subtraction 117 makes a subtracting operation $|d_n-d_{n-1}|$. The difference obtained as a result of the subtraction by the subtractor 117 is applied to the comparator 119. The other input of the comparator 119 is connected to receive the reference value $d_r$ from a reference value setting circuit 118. The comparator 119 provides a stable state detected output of the high level if and when the subtraction result by the subtractor 117 is equal to or smaller than the reference value $d_r$ set in the reference value setting circuit 118, i.e. if and when $|d_n-d_{n-1}| \leq d_r$. More specifically, according to the FIG. 7 embodiment, a stable state detected output is obtained as the high level, if and when the difference between the newest digital data and the previous digital data is within the range of being smaller than $d_r$. It is pointed out that according to the present invention the reference value $d_r$ may be selected to be as small as possible and even to be the numerical value zero.

Although in the embodiments shown in FIGS. 1, 6 and 7 the stable state detecting circuit 11 was described as implemented in a digital processing scheme, it is pointed out that various changes and modifications of such stable state detecting circuit 11 would be obvious to those skilled in the art without departing from the spirit of the present invention.

Figure 8:
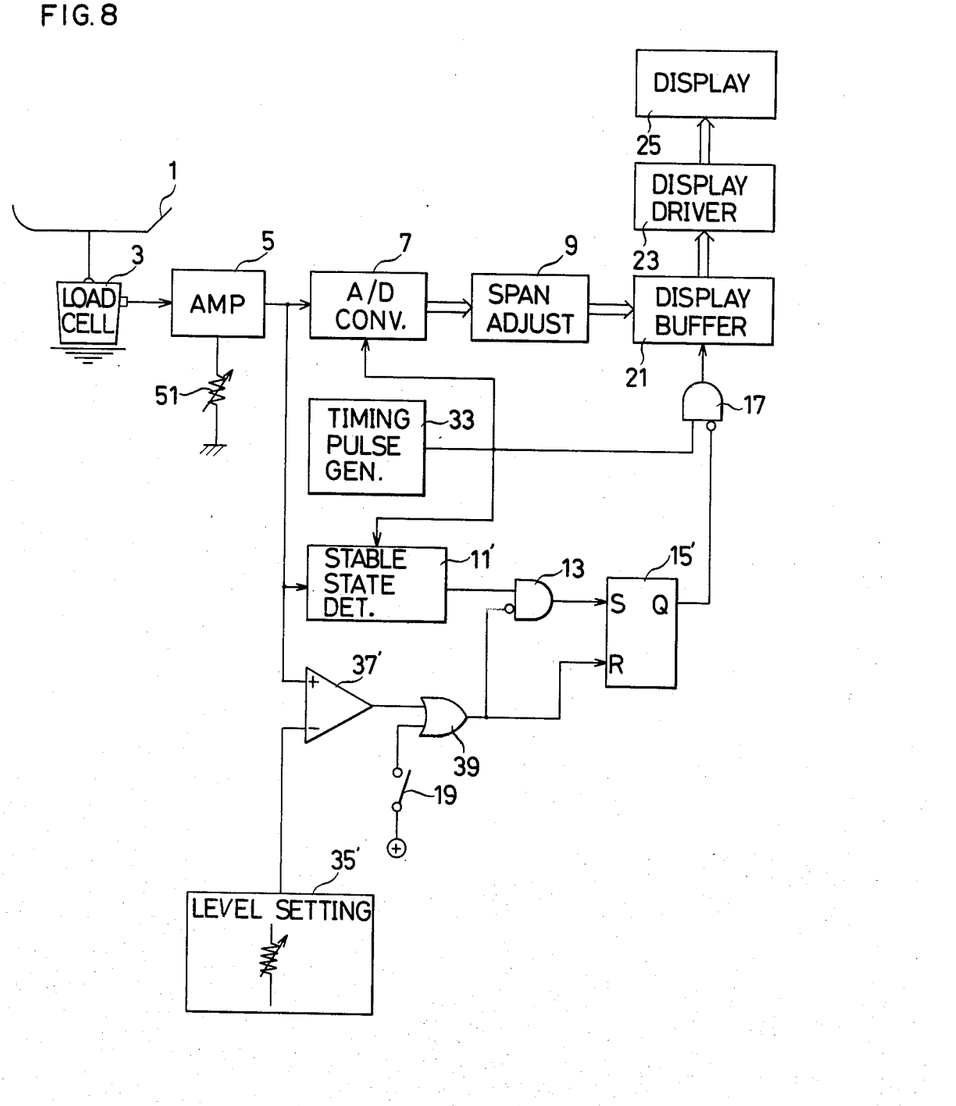
FIG. 8 is a block diagram showing another embodiment of the present invention.

FIG. 8 is a block diagram showing another embodiment of the present invention. The FIG. 8 embodiment is substantially the same as the FIG. 1 embodiment, except for the following points. More specifically, the FIG. 8 embodiment employs a stable state detecting circuit 11 implemented in an analog processing scheme. To that end, the stable state detecting circuit 11' is structured to receive the output of the amplifier 5. The comparator 37' also employs an operational amplifier, for example, for the purpose of analog processing. To that end, the comparator 37' is also connected to receive the output of the amplifier 5. The other input of the comparator 37' is connected to receive the reference level obtained from the level setting circuit 35'. The reference level is selected to be a level corresponding to the minimum unit displayable, as is similar to the reference value $d_a$ present by the reference value setting circuit 35 in the FIG. 1 embodiment. Although not shown, the stable state detecting circuit 11' may be implemented by a charge transfer device, such as a bucket brigade device, a charge coupled device or the like and a comparator. To that end, the stable state detecting circuit 11' is connected to receive the timing pulse from the timing pulse generator 33. The output of the stable state detecting circuit 11' is applied to an inhibit gate 13. The output of the comparator 37' is applied to one input of an OR gate 19. The other input of the OR gate 39 is connected to the switch 39. Accordingly, the OR gate 39 provides the high level output if and when the high level output is obtained from the comparator 37' or the switch 19 is manually operated so that the contact is turned on. The output of the OR gate 39 is applied to the inhibit input of the inhibit gate 13 and is also applied to the reset input R of the flip-flop 15'. The set input S of the flip-flop 15 is connected to receive the output of the inhibit gate 13.

Although in the above described embodiments the reference value setting circuits 35 and 35' were structured to set a piece of data or level corresponding to the minimum unit displayable in the display 25, alternatively a piece of data or level corresponding to the weight value larger than that may be employed or may be zero.

Although in the foregoing the numerical value setting means for the purpose of span adjustment was described by taking an example of a digital switch, alternatively such digital data corresponding to such numerical value may be obtained from a separate control circuit without providing such a digital switch.

The stable state detecting circuit 11 or 11' may be structured to make detection with a given range of detection accuracy as shown in FIG. 7 or to make detection upon coincidence but the condition for determination may be properly selected in consideration of the movement of an article being weighed or the movement of an article which can be expected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic weighing apparatus employing a strain gauge type load cell and digital display, particularly applicable as a live body scale for babies and other live load articles whose movement changes the displayed body or article weight, comprising article placement means for placement of an article being weighed, analog signal generating means operatively coupled to said article placement means and responsive to the weight of an article being placed on said article placement means for generating an analog signal representative of the measured weight of said article, digital data generating means responsive to said analog signal from said analog signal generating means for generating digital data associated with said analog signal and thus the weight of said article, digital data storing means operatively coupled to said digital data generating means for storing said digital data, digital data display means responsive to said digital data stored in said digital data storing means for sequentially displaying in a digital manner the measured weight of said article, stable state detecting means operatively coupled to at least one of said analog generating means and said digital data generating means and responsive to at least one of said analog signal and said digital data for sampling said digital data at predetermined intervals of time, comparing the digital data from successive intervals, and determining that said article placement means has reached for the first time a substantially stable state after said article is placed on said article placement means, display maintaining means responsive to the output of said stable state detecting means for arresting the sequential display of digital data and for maintaining the data being displayed by said display means at said weighed value obtained when said stable state was determined in spite of movement of the body or article being weighed causing a variation in the measured weight sampled by said stable state detecting means, detecting means operatively coupled to at least one of said analog signal generating means and said digital data generating means for detecting that at least one of said analog signal and said digital data has become smaller than a predetermined value after said stable state detected output has been determined, and releasing means responsive to the detected output of said detecting means for releasing said display maintaining state by said display maintaining means.

2. An electronic weighing apparatus in accordance with claim 1, wherein said display maintaining means comprises inhibiting means responsive to the output of said stable state detecting means for inhibiting said digital data storing means from storing a new piece of digital data in a renewed manner.

3. An electronic weighing apparatus in accordance with claim 1 or 2, which further comprises
    timing pulse generating means for generating a timing pulse at a given time interval, and wherein
    said digital data generating means comprises converting means responsive to said timing pulse from said timing pulse generating means for converting said analog signal into said digital data.

4. An electronic weighing apparatus in accordance with claim 3, wherein said stable state detecting means comprises means responsive to said timing pulse for receiving the digital data from said digital data generating means and for determining whether said stable state has been reached based on at least two pieces of said digital data obtained at different timings.

5. An electronic weighing apparatus in accordance with claim 4, wherein said stable state detecting means is structured to provide a stable state detected output if and when said at least two pieces of said digital data obtained at different timings are substantially equal to each other.

6. An electronic weighing apparatus in accordance with claim 5, wherein said stable state detecting means comprises
    at least two cascade connected register means, structured to shift said digital data responsive to each said timing pulse from said timing pulse generating, and
    coincidence detecting means for detecting coincidence of at least two pieces of said digital data as stored in said at least two register means, respectively, for providing a stable state detected output.

7. An electronic weighing apparatus in accordance with claim 5, wherein said stable state detecting means comprises
    register means for receiving said digital data from said digital data generating means and responsive to said timing pulse from said timing pulse generating means for shifting out said digital data,
    coincidence detecting means for detecting coincidence of the digital data at the input of said register means and the digital data at the output of said register means,
    shift register means for receiving the output of said first coincidence detecting means and having a plurality of storing cells for making a shift operation responsive to the timing pulse obtained from said timing pulse generating means, and
    second coincidence detecting means for detecting coincidence of the contents in each of said store cells of said shift register means for providing said stable state detected output.

8. An electronic weighing apparatus in accordance with claim 4, wherein said stable state detecting means is structured to provide a stable state detected output if and when the difference between at least two pieces of the digital data obtained at different timings becomes smaller than a predetermined value.

9. An electronic weighing apparatus in accordance with claim 8, wherein said stable state detecting means comprises
register means for receiving the digital data from said digital data generating means and responsive to the timing pulse from said timing pulse generating means for shifting out the digital data,
subtraction means for evaluating a difference between the digital data at the input of said register means and the digital data at the output of said register means, and
detecting means for detecting that the difference output of said subtraction means becomes smaller than a predetermined value for providing said stable state detected output.

10. An electronic weighing apparatus in accordance with claim 3, wherein said digital data storing means comprises means responsive to the timing pulse obtained from said timing pulse generating means for storing in a renewed manner the digital data obtained from said digital data generating means.

11. An electronic weighing apparatus in accordance with claim 10, wherein said display maintaining means comprises inhibit gate means responsive to said stable state detected output from said stable state detecting means for inhibiting thereafter said timing pulse obtained from said timing pulse generating means from being applied to said digital data storing means.

12. An electronic weighing apparatus in accordance with claim 1, which further comprises timing pulse generating means for generating a timing pulse at a given time interval, and wherein said stable state detecting means comprises means responsive to each said timing pulse obtained from said timing pulse generating means for receiving said analog signal obtained from said analog signal generating means for comparing at least two analog signals obtained at different timings for providing said stable state detected output if and when the difference between said at least two analog signals is smaller than a predetermined value.

13. An electronic weighing apparatus in accordance with claim 1, which further comprises
operable switching means, and
disabling means responsive to the operation of said operable switching means for disabling said display maintaining means.

14. An electronic weighing apparatus in accordance with claim 1, which further comprises
span adjusting means for receiving said digital data from said digital data generating means, said span adjusting means comprising numerical value setting means for variably setting a numerical value for span adjustment which is smaller than the unity, and multiplication/division means for making at least one of multiplication and division with respect to said numerical value obtained from said numerical value setting means and said digital data.

15. An electronic weighing apparatus in accordance with claim 14, which further comprises
amplifying means for amplifying said analog signal obtained from said analog signal generating means, and
second span adjusting means for variably adjusting the amplification factor of said amplifying means for achieving span adjustment.

16. An electronic weighing apparatus in accordance with claim 15, wherein said numerical value setting means is structured to fixedly set a more significant digit and to variably set a lower significant digit of said numerical value, whereby coarse span adjustment is made by means of said second span adjusting means and fine span adjustment is made by means of said numerical value setting means.

* * * * *

UNITED STATES PATENT AND TRADEMARK OFFICE
CERTIFICATE OF CORRECTION

PATENT NO. : 4,285,411

DATED : August 25, 1981

INVENTOR(S) : Masamichi Hino et al

It is certified that error appears in the above-identified patent and that said Letters Patent is hereby corrected as shown below:

Claim 1, line 22, "analog generating" should read:
--analog signal generating--.

Claim 6, line 6, "generating" should read: --generator--.

Signed and Sealed this

Twenty-sixth Day of October 1982

[SEAL]

Attest:

Attesting Officer

GERALD J. MOSSINGHOFF

Commissioner of Patents and Trademarks